United States Patent
Kurungot et al.

(10) Patent No.: US 10,218,006 B2
(45) Date of Patent: Feb. 26, 2019

(54) PROCESS FOR THE PREPARATION OF NITROGEN DOPED CARBON NANOHORNS FOR OXYGEN REDUCTION ELECTROCATALYSIS

(71) Applicant: Council of Scientific & Industrial Research, New Delhi (IN)

(72) Inventors: Sreekumar Kurungot, Maharashtra (IN); Sreekuttan Maraveedu Unni, Maharashtra (IN); Sarath Ramadas, Maharashtra (IN)

(73) Assignee: Council of Scientific & Industrial Research, New Delhi (IN)

( * ) Notice: Subject to any disclaimer, the term of this patent is extended or adjusted under 35 U.S.C. 154(b) by 199 days.

(21) Appl. No.: 15/031,689

(22) PCT Filed: Oct. 22, 2014

(86) PCT No.: PCT/IN2014/000675
§ 371 (c)(1),
(2) Date: Apr. 22, 2016

(87) PCT Pub. No.: WO2015/059718
PCT Pub. Date: Apr. 30, 2015

(65) Prior Publication Data
US 2016/0240861 A1    Aug. 18, 2016

(30) Foreign Application Priority Data

Oct. 25, 2013    (IN) .......................... 3169/DEL/2013

(51) Int. Cl.
*H01M 4/90*    (2006.01)
*H01M 4/96*    (2006.01)
(Continued)

(52) U.S. Cl.
CPC ........... *H01M 4/9091* (2013.01); *C01B 32/15* (2017.08); *H01M 4/8882* (2013.01); *B82Y 40/00* (2013.01)

(58) Field of Classification Search
CPC ... C01B 32/15; C01B 31/022; C01B 31/0226; C01B 31/0233; C01B 31/024; C01B 31/0246; C01B 31/0253; C01B 31/026; C01B 31/0266; C01B 31/0273; C01B 31/028; C01B 31/0286; C01B 31/0293; C01B 2202/20; C01B 2202/22; C01B 2202/24; C01B 2202/26; C01B 2202/28; C01B 2202/30; C01B 2202/32; C01B 2202/34; C01B 2202/36; H01M 4/9091;
(Continued)

(56) References Cited

FOREIGN PATENT DOCUMENTS

JP    2013-170093 A    9/2013

OTHER PUBLICATIONS

Li, et al., Simultaneous Nitrogen Doping and Reduction of Graphene Oxide, J. Am. Chem. Soc. 2009; 131: 15939-15944.*
(Continued)

*Primary Examiner* — Daniel McCracken
(74) *Attorney, Agent, or Firm* — Knobbe, Martens, Olson & Bear, LLP

(57) ABSTRACT

Nitrogen doped carbon nanohorns function as efficient metal-free oxygen reduction electrocatalysts for anion exchange membrane fuel cells. The disclosure relates to a process for the preparation of nitrogen doped carbon nanohorns with enhanced conductivity and improved surface area.

6 Claims, 12 Drawing Sheets

(51) Int. Cl.
*H01M 8/1018* (2016.01)
*H01M 4/88* (2006.01)
*C01B 32/15* (2017.01)
*B82Y 40/00* (2011.01)

(58) Field of Classification Search
CPC ........ H01M 4/8882; B82Y 40/00; B82Y 5/00; B82Y 10/00; B82Y 15/00; B82Y 20/00; B82Y 25/00; B82Y 30/00; B82Y 35/00
See application file for complete search history.

(56) References Cited

OTHER PUBLICATIONS

Hummers, et al., Preparation of Graphitic Oxide, J. Am. Chem. Soc. 1958; 80(6): 1339.*
Guo, et al., A Green Approach to the Synthesis of Graphene Nanosheets, ACS Nano 2009; 3(9): 2653-2659.*
Xu, et al., Double oxidation with oxygen and hydrogen peroxide for hole-forming in single wall carbon nanohorns, Appl Phys A 2010; 100: 379-383.*
Murata, et al., Molecular Potential Structures of Heat-Treated Single-Wall Carbon Nanohorn Assemblies, J. Phys. Chem. B 2001; 105: 10210-10216.*
Murata, K. et al. 2001 "Molecular potential structures of heat-treated single-wall carbon nanohorn assemblies" *J Phys Chem B* 105: 10210-10216.
Sun, L. et al. 2013 Flowing nitrogen assisted-arc discharge synthesis of nitrogen-doped single-walled carbon nanohorns *Applied Surface Science* 277: 88-93.
Yang, C.-M. et al. 2005 "Highly ultramicroporous single-walled carbon nanohorn assemblies" *Advanced Materials* 17: 866-970.
Biddinger, E.J. et al. 2009 "Nitrogen-Containing Carbon Nanostructures as Oxygen-Reduction Catalysts" *Top Catal* 52:1566-1574.
Lin, Z. et al. 2012 "Facile Synthesis of Nitrogen-Doped Graphene via Pyrolysis of Graphene Oxide and Urea, and its Electrocatalytic Activity toward the Oxygen-Reduction Reaction" *Adv. Energy Mater* 2: 884-888.
Pramoda, K. et al. 2014 "Synthesis, Characterization and Properties of Single-Walled Carbon Nanohorns" *J Clust Sci* 25:173-188.
Sheng, Z.-H. et al. 2011 "Catalyst-Free Synthesis of Nitrogen-Doped Graphene via Thermal Annealing Graphite Oxide with Melamine and Its Excellent Electrocatalysis" *ACS Nano* 5(6): 4350-4358.
Xiong, C. et al. 2012 "Nitrogen-doped carbon nanotubes as catalysts for oxygen reduction reaction" *Journal of Power Sources* 215: 216-220.
Yang, C.-M. et al. 2007 "Nanowindow-Regulated Specific Capacitance of Supercapacitor Electrodes of Single-Wall Carbon Nanohorns" *J Am Chem Soc* 129: 20-21.
Zhu, S. et al. 2010 "Single-walled carbon nanohorns and their applications" *Nanoscale* 2: 2538-2549.

* cited by examiner

PROCESS FOR THE PREPARATION OF NITROGEN DOPED CARBON NANOHORNS FOR OXYGEN REDUCTION ELECTROCATALYSIS

FIELD OF INVENTION

The present invention relates to a process for the preparation of nitrogen doped carbon nanohorns for oxygen reduction electrocatalysis. Particularly, the present invention provides a process for the preparation of nitrogen doped carbon nanohorns with enhanced conductivity and improved surface area. More particularly, the present invention relates to a process for the preparation of nitrogen doped carbon nanohorns with enhanced conductivity and improved surface area for use as an efficient metal-free oxygen reduction electrocatalyst for anion exchange membrane fuel cells.

BACKGROUND AND PRIOR ART

High cost and unavailability of platinum catalyst is the main hurdle to commercialize polymer electrolyte membrane fuel cells (PEMFC). Since platinum based catalysts are inevitable for PEMFC cathode in current situation, a material showing comparable or higher activity to platinum based catalyst with low cost is a need and a challenging task. Carbon allotropes are proven to be best candidates to improve kinetically slow oxygen reduction reaction (ORR). Most of the carbon morphologies are lacking high surface area with good electrical conductivity. Both surface area and electrical conductivity are inevitable properties of a material for ORR. But both are complimentary to each other. If surface area of the material is increasing, simultaneously its conductivity will come down. So it is important to provide a material with both high surface area and conductivity.

Graphene is reported to have theoretical surface area more than 2000 m$^2$/g. But, surface area of synthesized graphene is less than 1000 m$^2$/g. Different methods have been employed to improve the surface area of graphene, but it reduces electrical conductivity of graphene. Other carbon morphologies such as carbon nanotubes, nanofiber and such like have low surface area, but have good conductivity. Recently, heteroatom doped, mainly nitrogen doped carbon morphologies are proving to be an alternative to Pt based ORR catalyst. But a nanostructure with high surface area (for proper mass diffusion) and high electrical conductivity along with nitrogen doping still remains a hurdle to the scientific community.

Article titled "Flowing nitrogen assisted-arc discharge synthesis of nitrogen-doped single-walled carbon nanohorns" by L Sun et al. published in *Applied Surface Science*, 15 Jul. 2013, Volume 277, Pages 88-93 reports nitrogen-doped single-walled carbon nanohorns (N-SWCNHs) synthesized by a flowing nitrogen assisted arc discharge method at atmospheric pressure in a tubular reactor. X-ray diffraction and thermo gravimetric analysis have revealed their high quality. Scanning electron microscopy and transmission electron microscopy examinations have shown that N-SWCNHs have typical spherical structure with a diameter of 40-80 nm. Oxidation treatment suggests the opening of cone-shaped caps of N-SWCNHs. The FT-IR and X-ray photoelectron spectroscopy analysis indicate that most of the nitrogen atoms are in N-6, N-5, and triple-bonded —CN bonding configuration present at the defect sites or the edges of graphene layers.

Article titled "Single-walled carbon nanohorns and their applications" by S Zhu et al. published in *Nanoscale*, 2010, 2, 2538-2549 reports Single-walled carbon nanohorns (SW-CNHs) horn-shaped single-walled tubules with a conical tip. They are generally synthesized by laser ablation of pure graphite without using metal catalyst with high production rate and high yield, and typically form radial aggregates. SWCNHs are essentially metal-free and very pure, which avoids cumbersome purification and makes them user-friendly and environmentally benign. Currently, SWCNHs have been widely studied for various applications, such as gas storage, adsorption, catalyst support, drug delivery system, magnetic resonance analysis, electrochemistry, biosensing application, photovoltaics and photoelectrochemical cells, photodynamic therapy, fuel cells, and so on. This review outlines the research progress on SWCNHs, including their properties, functionalization, applications, and outlook.

Article titled "Facile Synthesis of Nitrogen-Doped Graphene via Pyrolysis of Graphene Oxide and Urea, and its Electrocatalytic Activity toward the Oxygen-Reduction Reaction" by Z Lin et al. published in *Advanced Energy Materials*, July, 2012, Volume 2, Issue 7, pages 884-888 reports Nitrogen-doped graphene (NG) as a promising metal-free catalyst for the oxygen-reduction reaction (ORR). A facile and low-cost synthesis of NG via the pyrolysis of graphene oxide and urea is reported. The N content in NG can be up to 7.86%, with a high percentage of graphitic N (≈24%), which gives rise to an excellent catalytic activity toward the ORR.

Article titled "Catalyst-free synthesis of nitrogen-doped graphene via thermal annealing graphite oxide with melamine and its excellent electrocatalysis" by Z H Sheng et al. published in *ACS Nano*, 2011, 5 (6), pp 4350-4358 reports the electronic and chemical properties of graphene can be modulated by chemical doping foreign atoms and functional moieties. The general approach to the synthesis of nitrogen-doped graphene (NG), such as chemical vapor deposition (CVD) performed in gas phases, requires transitional metal catalysts which could contaminate the resultant products and thus affect their properties. The article discloses a facile, catalyst-free thermal annealing approach for large-scale synthesis of NG using low-cost industrial material melamine as the nitrogen source. This approach can completely avoid the contamination of transition metal catalysts, and thus the intrinsic catalytic performance of pure NGs can be investigated. Detailed X-ray photoelectron spectrum analysis of the resultant products shows that the atomic percentage of nitrogen in doped graphene samples can be adjusted up to 10.1%. Such a high doping level has not been reported previously. High-resolution N1s spectra reveal that the as-made NG mainly contains pyridine-like nitrogen atoms. Electrochemical characterizations clearly demonstrate excellent electrocatalytic activity of NG toward the oxygen reduction reaction (ORR) in alkaline electrolytes, which is independent of nitrogen doping level. The present catalyst-free approach opens up the possibility for the synthesis of NG in gram-scale for electronic devices and cathodic materials for fuel cells and biosensors.

Article titled "Synthesis, characterization and properties of single-walled carbon nanohorns" by K Pramoda et al. published in *Journal of Cluster Science*, January 2014, Volume 25, Issue 1, pp 173-188 reports single-walled nanohorns (SWNHs) prepared by sub-merged arc discharge of graphite electrodes in liquid nitrogen. The samples were examined by scanning electron microscopy, transmission electron microscopy and Raman spectroscopy. Nitrogen and boron doped SWNHs have been prepared by the sub-merged arc discharge method using melamine and elemental boron as precursors. Intensification of Raman D-band and stiffening of G-band has been observed in the doped samples. The electrical resistance of the SWNHs varies in opposite directions with nitrogen and boron doping. Functionalization of SWNHs through amidation has been carried out for solubilizing them in non-polar solvents. Water-soluble SWNHs have been produced by acid treatment and non-covalent functionalization with a coronene salt. SWNHs have been decorated with nanoparticles of Au, Ag and Pt. Interaction of electron donor (tetrathiafulvalene, TTF) and acceptor molecules (tetracyanoethylene, TCNE) with SWNHs has been investigated by Raman spectroscopy. Progressive softening and stiffening of Raman G-band has been observed respectively with increase in the concentration of TTF and TCNE.

Article titled "Nitrogen-Containing Carbon Nanostructures as Oxygen-Reduction Catalysts" by E J Biddinger et al. published in *Topics in Catalysis*, October 2009, Volume 52, Issue 11, pp 1566-1574 reports nitrogen-containing carbon nano structure (CNx) catalysts developed by acetonitrile pyrolysis have been studied to better understand their role in the oxygen reduction reaction (ORR) in PEM and direct methanol fuel cell environments. Additional functionalization of the CNx catalysts with nitric acid has the ability to improve both the activity and selectivity towards ORR.

Article titled "Nitrogen-doped carbon nanotubes as catalysts for oxygen reduction reaction" by C Xiong et al. published in *Journal of Power Sources*, 1 Oct. 2012, Volume 215, Pages 216-220 reports the aligned nitrogen-doped carbon nanotubes (NCNT) with bamboo-like structure are synthesized via thermal chemical vapor deposition using melamine and urea as different nitrogen precursors. Meanwhile, ferrocene is used as catalyst and carbon precursor. The resulting NCNT with melamine (M-NCNT) have shown superior ORR performance in terms of limiting current density and number of electrons transferred. Further characterizations by X-ray photoelectron spectroscopy (XPS) and Raman spectroscopy illustrated higher nitrogen content and more defects in M-NCNT compared to that in NCNT with urea (U-NCNT), which indicate the important role of the nitrogen precursor in nitrogen content and structure of NCNT. It is concluded that higher nitrogen content and more defects of NCNT lead to high performance of ORR.

It is observed that simple oxidation creates "nanowindows" on the walls of single walled carbon nanohoms (SWCNH), which enhances its surface area, refer Murata et al in *J. Phys. Chem. B* 2001, 105, 10210-10216 and Yang et at in *J. Am. Chem. Soc.* 2006, 129, 20-21.

But, there is no report that discloses doped carbon nanohoms that displays properties that enable their use as anion exchange membrane fuel cell catalyst.

OBJECTIVE OF INVENTION

The main objective of the present invention is to provide a process for the preparation of nitrogen doped carbon nanohorns for oxygen reduction electrocatalysis with enhanced conductivity and improved surface area.

Another objective of the present invention is to provide a process for the preparation of nitrogen doped carbon nanohorns with enhanced conductivity and improved surface area for use as an efficient metal-free oxygen reduction electrocatalyst for anion exchange membrane fuel cells.

SUMMARY OF THE INVENTION

Accordingly, the present invention provides a process for the preparation of nitrogen doped carbon nanohorns with enhanced conductivity and improved surface area comprising following steps:

a. Pre-treating the carbon nanohorns;
b. Annealing the carbon nanohorns of step (a) in the presence of a nitrogen source at 500-1200° C. for 1-3 hours.

In one embodiment of the present invention the carbon nanohoms is preferably single walled carbon nanohorns.

In an embodiment of the present invention the nitrogen source is selected from urea, melamine In another embodiment of the present invention the nitrogen doped carbon nanohoms are optionally co-doped with metal selected from Fe and Co.

Still in another embodiment of the present invention pre-treatment of carbon nanohorns was carried out for functionalization of carbon nanohorn.

Still in another embodiment of the present invention functionalization is carried out using hydrogen peroxide.

Still in another embodiment of the present invention surface area of nitrogen doped carbon nanohoms ranges from 300 to 1500 $m^2 g^{-1}$.

Still in another embodiment of the present invention conductivity of nitrogen doped carbon nanohorns is in the range of 5-9 $S cm^{-1}$.

Still in another embodiment of the present invention nitrogen doped carbon nanohoms having surface area in the range of 300 to 1500 $m^2 g^{-1}$ and conductivity in the range of 5-9 $S cm^{-1}$, prepared by the above method.

Still in another embodiment of the present invention nitrogen doped carbon nanohorns are useful for oxygen reduction reaction (ORR).

ABBREVIATIONS USED

CNH: Carbon nanohorn
SWCNH: Single walled carbon nanohorn
FCNH: Functionalized carbon nanohorn
ORR: Oxygen reduction reaction

DETAILED DESCRIPTION OF THE INVENTION

Figure 1:
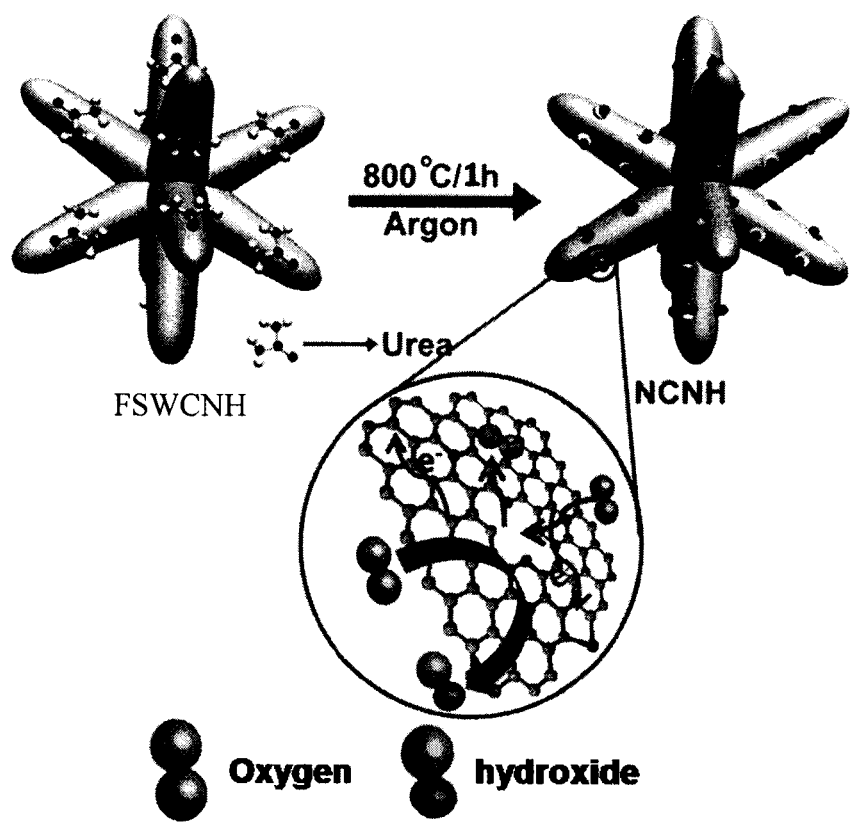
FIG. 1 depicts Scheme for synthesis of nitrogen doped single walled carbon nanohorns (NCNH).

The invention will now be described in detail in connection with certain preferred and optional embodiments, so that various aspects thereof may be more fully understood and appreciated.

The present invention provide a process for the preparation nitrogen doped carbon nanohorns such with enhanced conductivity and improved surface area comprising following steps:
(a) Pre-treating the carbon nanohorns;
(b) Annealing the carbon nanohorns of step (a) in the presence of a nitrogen source and optionally in the presence of a metal at 500-1200° C. for 1-3 hours.

The process for the preparation nitrogen doped carbon nanohorns as described above, wherein the carbon nanohorn is preferably single walled carbon nanohorns and source of nitrogen is selected from urea, melamine and such like. The metal is selected from Fe and Co.

The process for the preparation nitrogen doped carbon nanohorns as described above, wherein surface area of nitrogen doped carbon nanohorns is ranges from 300 to 1500 m$^2$ g$^{-1}$.

SWCNH is an assembly of hundreds of carbon nanohorns with diameter around 60 to 80 nm. Each nanohorn has a diameter around 3-4 nm. Surface area of this material varies from 300 to 400 m$^2$/g.

Functionalization of SWCNH improved its surface area from 325 to 1384 m$^2$/g and it further increased to 1836 m$^2$/g after nitrogen doping. Nitrogen doping further improved the electric conductivity and it prevented the knotting of pores. The usually observed problem of pore knotting in SWCNH is overcome by the disclosed process.

While the HR-TEM images indicate that annealing at higher temperature in the presence of argon atmosphere does not make substantial deformation in their morphology (Refer FIG. 2), EDAX analysis shows the presence of nitrogen in the samples. Amount of nitrogen is varying with the annealing temperature. N-600 shows the highest weight percentage of nitrogen (9.31 wt. %) and the nitrogen content reduces with increase in the temperature. N-800 has 7.42 wt. % nitrogen while N-1000 has 6.37 wt. %.

In an aspect of the invention, the ORR of the synthesized compositions was studied. Nitrogen in the synthesised composition has pyridinic coordination which is responsible for the reduction in the over potential of ORR. N-800 (SWCNH annealed at 800° C. with urea) shows higher activity towards ORR compared to other NCNH (annealed at 600 and 1000° C. with urea) and undoped nanohorns. N-800 reduces oxygen molecule to hydroxide ion through a four electron pathway in alkaline medium. N-800 shows 50 mV higher over potential towards ORR compared to Pt/C.

Among the different nitrogen doped systems, N-800 shows the highest conductivity (9.61 S cm$^{-1}$) compared to N-600 (7.39 S cm$^{-1}$) and N-1000 (7.35 S cm$^{-1}$). The lower conductivity of N-1000 compared to N-800 may be attributed to its high surface area, but still this value is higher than that of C-800 SWCNH annealed at 800° C. without urea), FCNH and SWCNH. The conductivity of nanohorn without doping is in the order of C-800 (7.07 S cm$^{-1}$)>SWCNH (6.57 S cm$^{-1}$)>FCNH (4.95 S cm$^{-1}$). This indicates that the functionalization of SWCNH (FCNH) along with the enhancements in the surface area decreases the conductivity of the material but its annealed product (C-800) attains enhanced conductivity due to the removal of the functional moieties.

Figure 13:
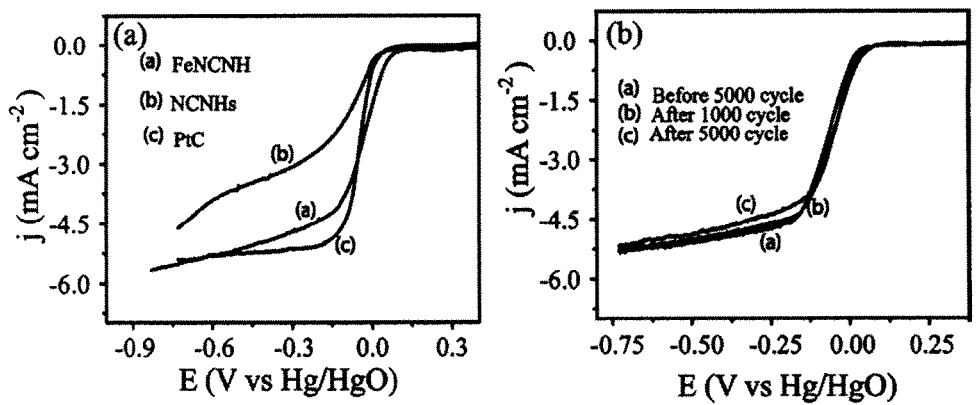
FIG. 13 depicts (a) Linear sweep voltammograms of the NCNH prepared by annealing FCNH and melamine mixture, Fe—NCNH and Pt/C with an platinum loading on 60 μg cm$^{-2}$ in 0.1 M oxygen saturated KOH at a rotation speed of 1600 rpm and a scan rate of 10 mV s$^{-1}$. (b) Linear sweep voltammograms of Fe—NNCNH before and after ADT in 0.1 M oxygen saturated KOH at a rotation speed of 1600 rpm and a scan rate of 5 mV s$^{-1}$.

NCNH prepared from FCNH and melamine mixture showing better ORR activity compared to same prepared from FCNH and urea mixture. Onset potential (0.7 V vs Hg/HgO) of NCNH is almost same as that of commercial Pt/C. After Fe coordination with NCNH (Fe—NCNH) ORR activity further improved which is even higher than Pt/C in terms of onset potential (0.1 V vs Hg/HgO) and half wave potential (−0.026V vs Hg/HgO). Moreover, ADT (accelerated durability test) analysis shows that ORR activity of Fe—NCNH is increasing with increasing potential cycle compared Pt/C. Excellent ORR activity of Fe—NCNH is mainly attributed to the Fe—N—C coordination and high surface area of the electrocatalyst. Refer FIG. 13. The following examples, which include preferred embodiments, will serve to illustrate the practice of this invention, it being understood that the particulars shown are by way of example and for purpose of illustrative discussion of preferred embodiments of the invention.

EXAMPLES

Following examples are given by way of illustration therefore should not be construed to limit the scope of the invention.

Example 1: Pre-Treatment of Carbon Nanohorns 2 g of SWCNH were mixed well with 100 ml methanol solution in order to remove its puffy nature. After filtrating this mixture, black powder were dried under vacuum at a temperature 80° C. for complete removal of methanol and resulting nanohorns were treated as pure SWCNH. 2 g of resulting SWCNH were mixed with 250 ml of 30% hydrogen peroxide in a round bottom flask and refluxed for 5 hours at 60° C. After functionalization, resulting solution were filtered and washed several time with deionized water for the complete removal of hydrogen peroxide. Resulting carbon nanohorns cakes were dried under vacuum for 12 h at temperature 80° C. This material was treated as functionalized single wall carbon nanohorns (FCNH).

Example 2: Synthesis of N-600

50 mg of FCNH was mixed with 250 mg urea using mortar and pestle followed by annealing at 600° C. for one hour in argon atmosphere. Resulting material was used as NCNHs referring to as N-600 without any purification.

Example 3: Synthesis of N-800

50 mg of FCNH was mixed with 250 mg urea using mortar and pestle followed by annealing at 800° C. for one hour in argon atmosphere. Resulting material was used as NCNHs referring to as N-800 without any purification.

Example 4: Synthesis of N-1000

50 mg of FCNH was mixed with 250 mg urea using mortar and pestle followed by annealing at 1000° C. for one hour in argon atmosphere. Resulting material was used as NCNHs referring to as N-1000 without any purification

Example 5: Reference Example

For comparison FCNH was annealed at 800° C. for 1 h without urea and was named as C-800.

Example 6: Synthesis of Nitrogen Doped Carbon Nanohorns Using Melamine (NCNH)

900 mg of melamine powder was first dissolved in 30 ml of distilled water by sonicating for 15 minutes followed by the addition of 300 mg functionalized single walled carbon nanohorn at temperature (at room temperature (25° C.). After complete mixing of melamine and single walled carbon nanohorn, the solvent was evaporated at 70° C. The obtained powder was annealed at high temperature (900° C.) in argon atmosphere for 3 hour in order to get nitrogen doped single walled carbon nanohoms. Morphology of nanohorns after high temperature annealing is intact and it has a spherical morphology with size in between 60-90 nm. Surface area of NCNH is 1327 $m^2/g$ which is less compared to NCNH prepared using FCNH and urea mixture. This reduction in surface area is mainly attributed the deposition of carbon derived from melamine during high temperature annealing on NCNH. Total nitrogen content in nanohorn is 2.2 wt. % which is compared to the NCNH prepared using urea. However, ORR activity of NCNH prepared using melamine as nitrogen source showing comparable onset potential with that of commercial 40% Pt/C.

Example 7: Synthesis of Fe Co-Doped Nitrogen Doped Carbon Nanohorns (Fe—NCNH)

900 mg of melamine powder was first dissolved in 30 ml of distilled water by sonicating for 15 minutes followed by the addition of 300 mg functionalized single walled carbon nanohorn at room temperature (25° C.). This process was followed by addition of 18 mg $FeCl_3$. Continuous sonication was preferred so that the reactants get well dispersed in the solution. The resultant mixture was kept for continuous stirring at 70° C. till the whole water content got evaporated. The dried mixture was annealed at 900° C. in argon atmosphere for 3 hours. Annealed mixture was subjected to acid washing by sonicating it for 30 minutes in con. HCl followed by filtration. Filtrate was kept for drying in hot oven at 60° C. surface area 1315 $m^2$ $g^{-1}$. The surface areas of FeNCNH-900 and NCNH are almost comparable but are 4 times higher than that of SWCNH. However, the surface areas of NCNH and FeNCNH are found to be lower, which is assumed to be due to the deposition of carbon on the surface of nanohorn during the decomposition of melamine.

Example 8: Characterization of FCNH

Figure 2:
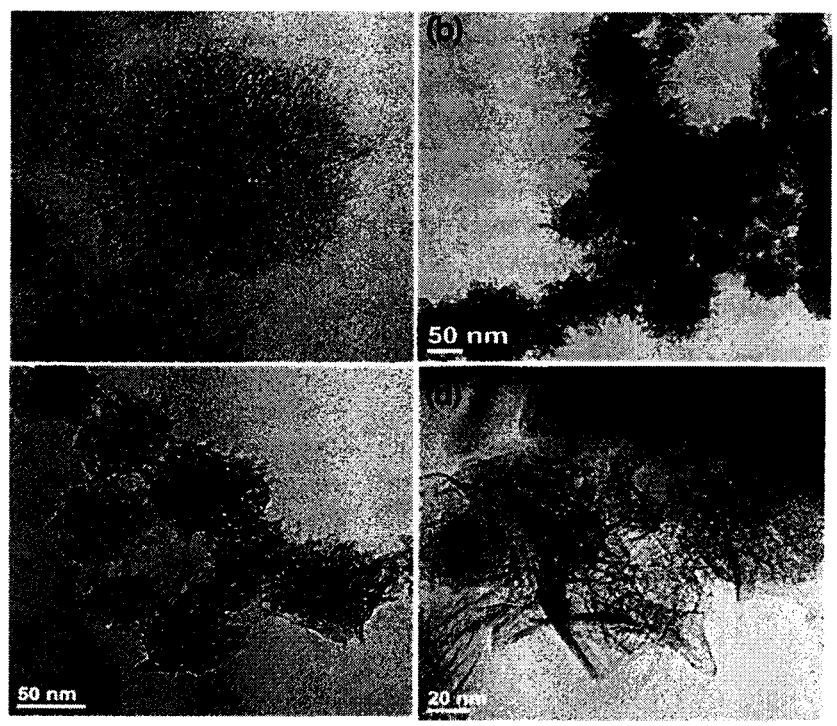
FIG. 2 shows HR-TEM images of (a) SWCNH, (b) FCNH and (c) & (d) N-800 under different magnifications.
Figure 3:
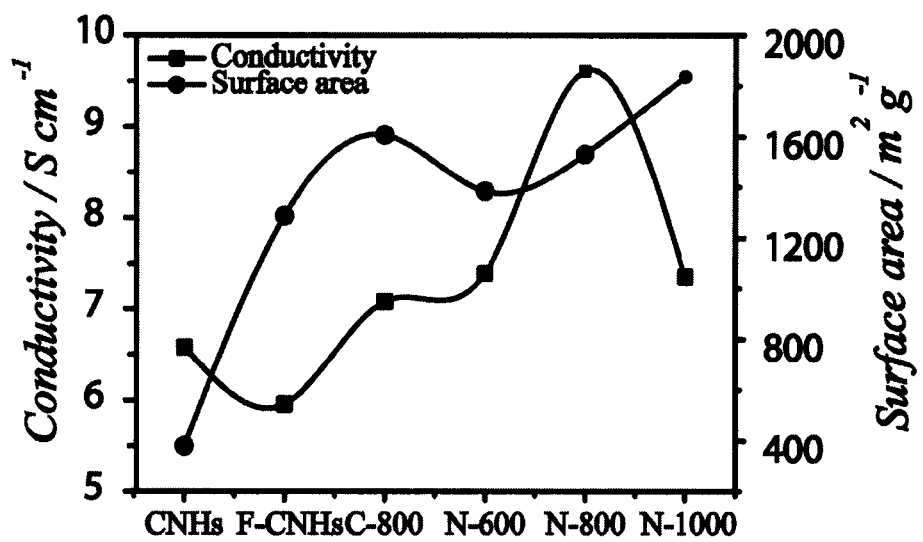
FIG. 3 shows plots corresponding to the changes in the electrical conductivity and surface area of the prepared carbon nanohorns samples. Surface area of nitrogen doped samples is increasing with annealing temperature.
Figure 4:
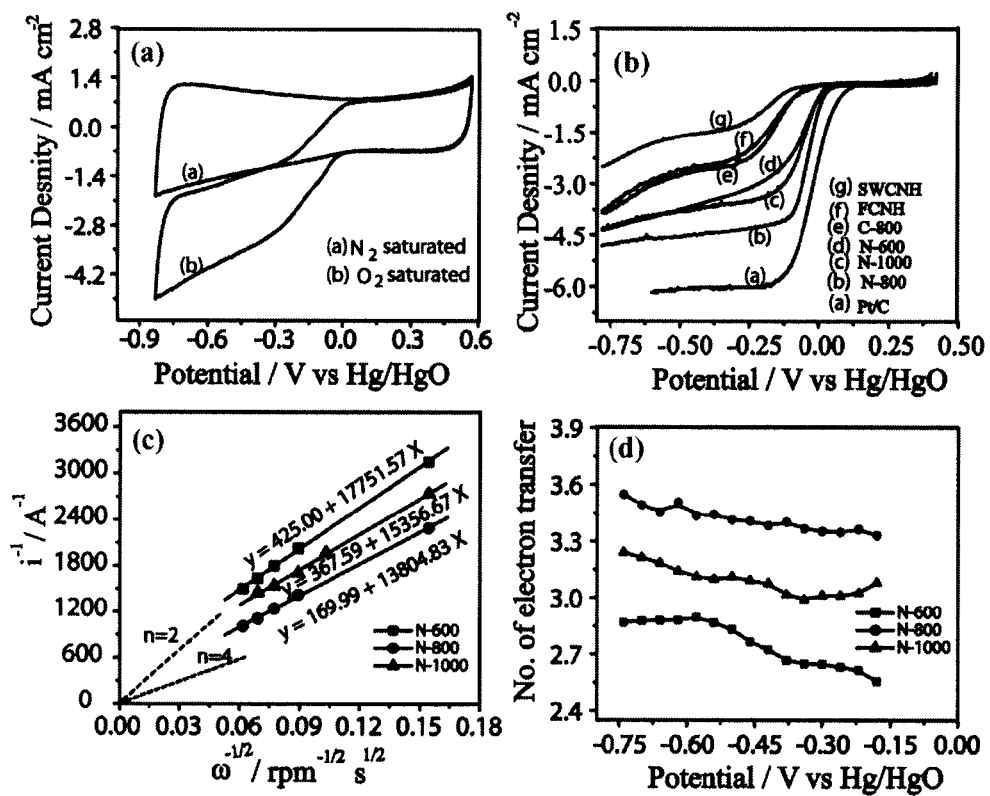
FIG. 4 (a) Cyclic voltammograms of N-800 recorded in nitrogen and oxygen saturated 0.1 M KOH solution at a scan rate of 50 mV $s^{-1}$ at an electrode rotation rate of 900 rpm. Glassy carbon electrode and Hg/HgO were used as the counter and reference electrodes respectively (b) Linear sweep voltammograms of the CNH samples and Pt/C with an platinum loading on 102 µg $cm^{-2}$ in 0.1 M oxygen saturated KOH at a rotation speed of 1600 rpm and a scan rate of 10 mV $s^{-1}$. (c) K-L plots of N-600, N-800 and N-1000 at a potential of −0.22 V vs. Hg/HgO. The plots are generated from the LSVs of all the three samples conducted in oxygen saturated 0.1 M KOH solution at different rotation speeds. Theoretical K-L plots for n=4 and n=2 are also given in the plot (d) The number of electrons transferred versus the potential as calculated from the K-L plots.
Figure 5:
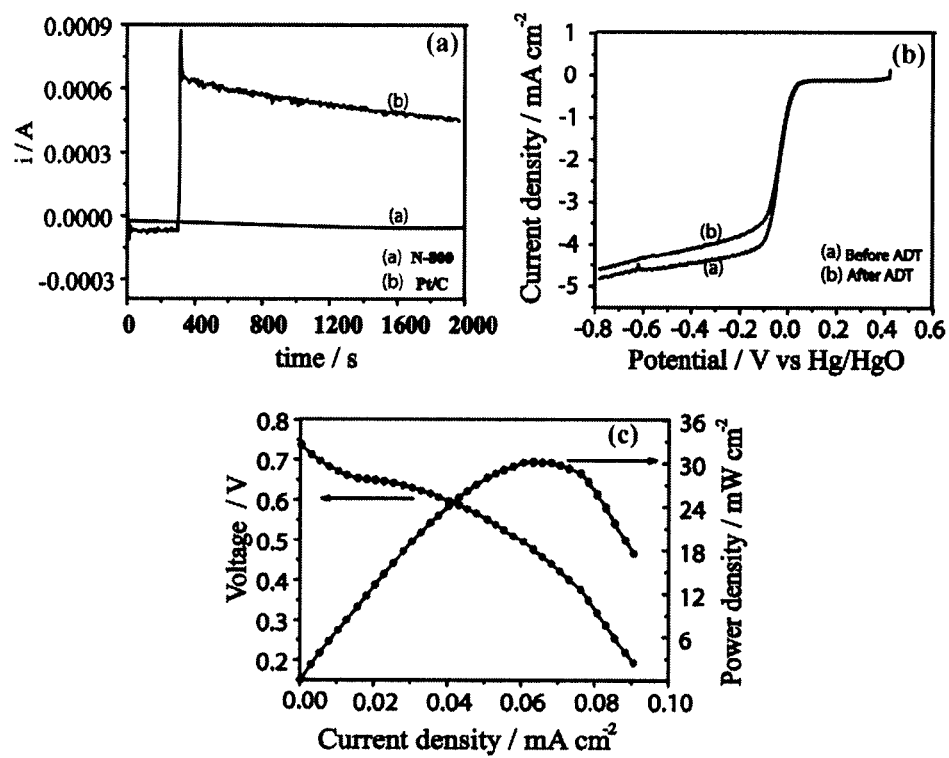
FIG. 5 (a) Methanol crossover study of N-800 and Pt/C at a rotation speed of 1000 rpm at −0.05 V. At 300 s; 3 M methanol was added into 0.1 M KOH electrolyte to evaluate the crossover effect. (b) Linear sweep voltammograms of N-800 before and after ADT in 0.1 M oxygen saturated KOH at a rotation speed of 1600 rpm and a scan rate of 10 mV s$^{-1}$. (c) Steady state polarization plot of anion exchange membrane fuel cell (AEMFC) with N-800 as cathode catalyst taken at 50° C.
Figure 6:
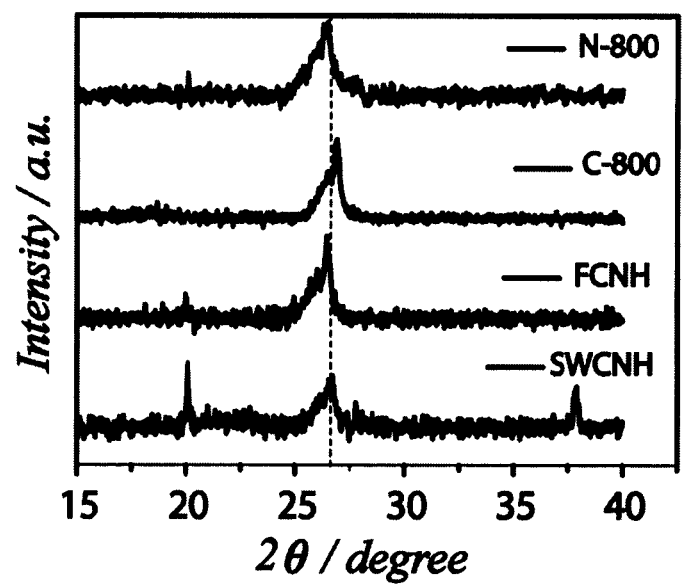
FIG. 6 depicts X-ray diffraction of SWCNH, FCNH, C-800 and N-800.
Figure 7:
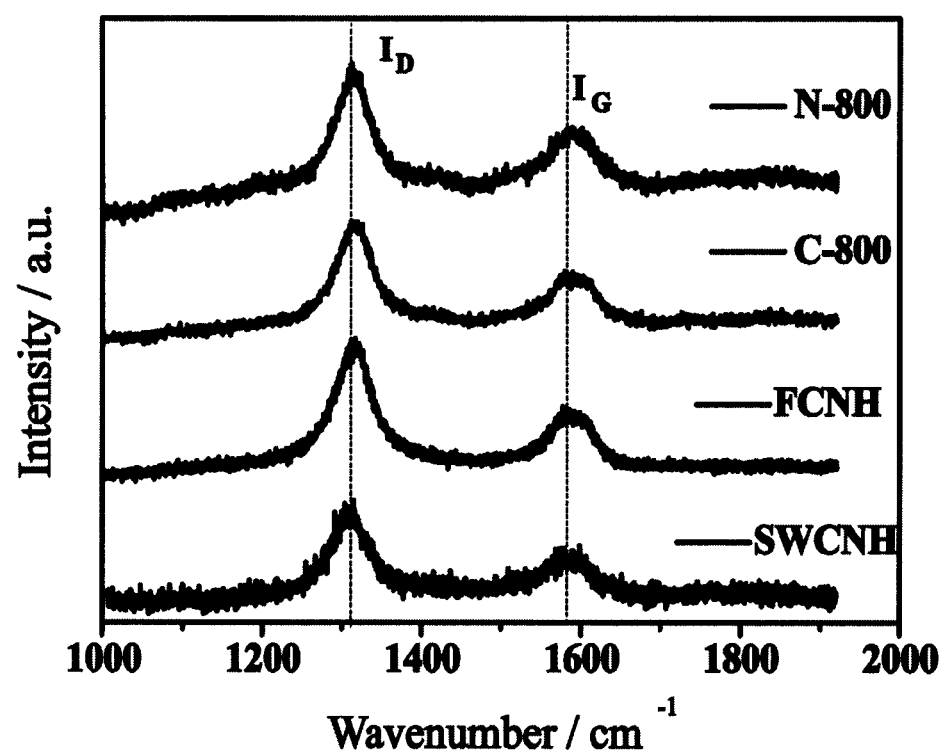
FIG. 7 depicts Raman spectra of SWCNH, FCNH, C-800 and N-800.
Figure 8:
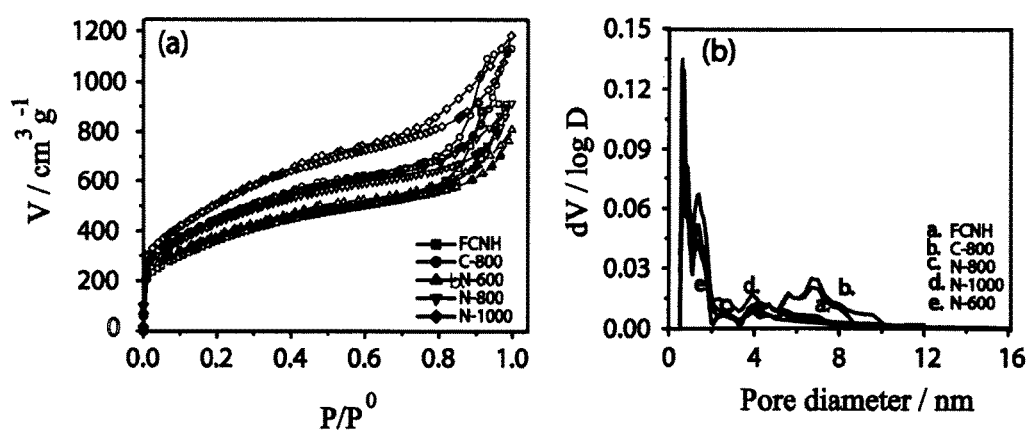
FIG. 8 (a) Nitrogen adsorption-desorption isotherm of FCNH, C-800, N-600, N-800 and N-1000. All nitrogen doped samples show Type II isotherms whereas CNH without doping shows Type IV isotherm. (b) Pore size distribution of FCNH, C-800, N-600, N-800 and N-1000.
Figure 9:
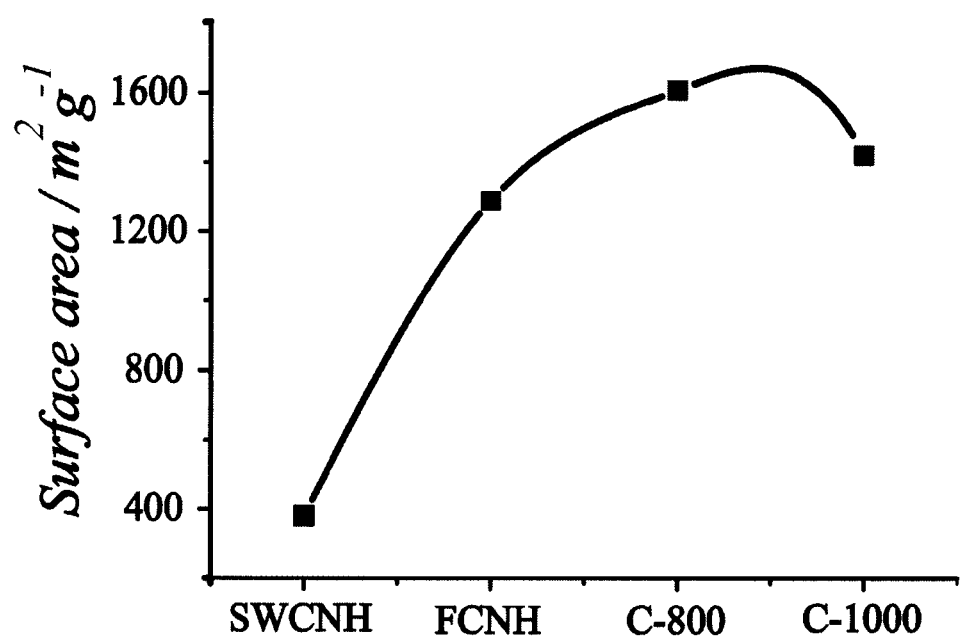
FIG. 9 depicts corresponding to the changes in surface area of the prepared carbon nanohorns samples without nitrogen doping (SWCNH, FCNH) annealed at different temperatures (C-800 and C-1000 to the FCNH samples annealed at 800 and 1000° C. respectively). Knotting of "nanowindow" of FCNH is happening at 1000° C., which leads to the reduction in the surface area.
Figure 10:
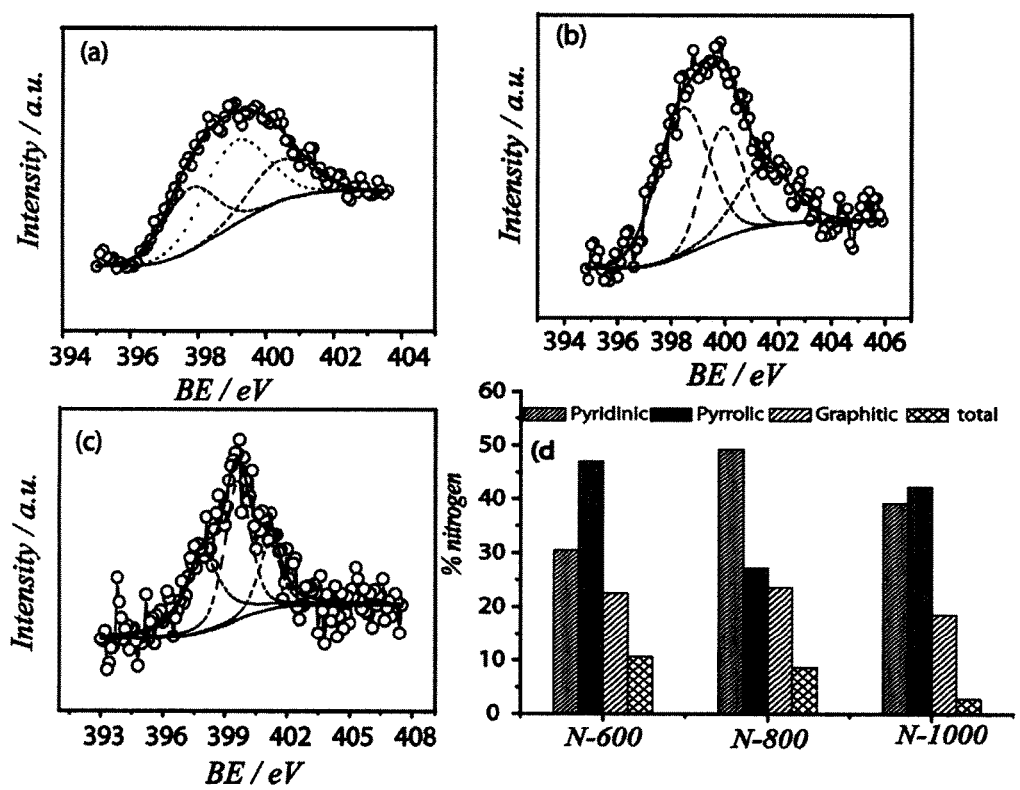
FIG. 10 depicts deconvoluted XPS spectra of N1s of (a) N-600, (b) N-800, (c) N-1000; (d) the estimated values of the different types of nitrogen in all the annealed samples.
Figure 11:
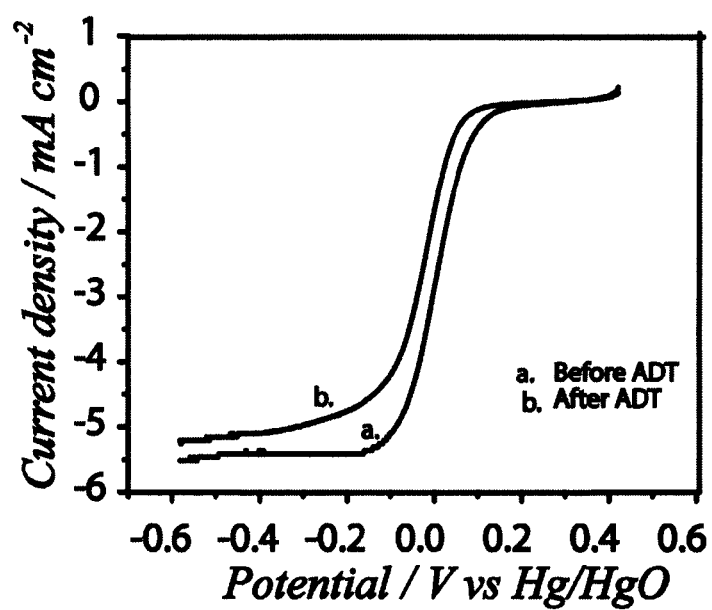
FIG. 11 depicts linear sweep voltammograms of Pt/C before and after ADT in 0.1 M oxygen saturated KOH at a rotation speed of 1600 rpm and a scan rate of 10 mV s$^{-1}$. Glassy carbon electrode and Hg/HgO were used as counter and reference electrode respectively.
Figure 12:
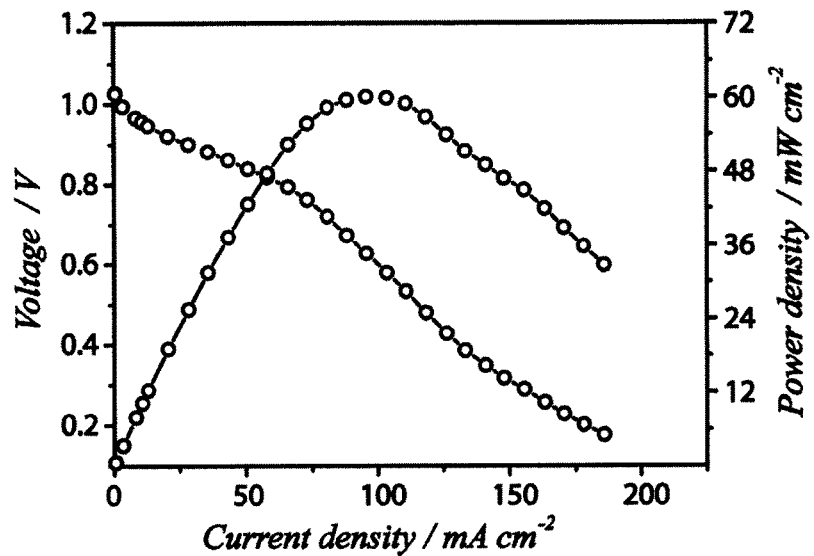
FIG. 12 depicts Steady state polarization plot of anion exchange membrane fuel cell (AEMFC) with Pt/C as cathode catalyst at 50° C.

Morphology of SWCNH was analysed using high resolution transmission electron microscopy (HR-TEM) which is shown in FIG. 2. From FIG. 2a, SWCNH are assembled and bundled to form a "dahlia" like morphology, having a size of around 60-80 nm. After functionalization, some morphology variations, even though not so prominent, occur due to the formation of functional groups as well as the generation of micro and mesopores (FIG. 2b). No coalescence is observed after functionalization and the individual bundles and their petals of FCNH remain intact like untreated SWCNH. This clearly indicates that annealing at higher temperature in the presence of argon atmosphere does not make substantial deformation in their morphology.

Example 9: Comparative Data

TABLE 1

Onset potential ORR of some of the non metal electrocatalyst recently reported.

| S. No. | References | Material | Catalyst loading and scan rate | Onset potential | Pt loading ($\mu g\ cm^{-2}$) | Over potential compared to Pt/C |
|---|---|---|---|---|---|---|
| 1 | Wang et al[55] ACS Nano 2011, 5, 4350-4358 | N-doped graphene | 10 µg, scan rate is not given. | −0.1 V vs Ag/AgCl | Bulk Platinum | 0.1 V |

TABLE 1-continued

Onset potential ORR of some of the non metal electrocatalyst recently reported.

| S. No. | References | Material | Catalyst loading and scan rate | Onset potential | Pt loading ($\mu g\ cm^{-2}$) | Over potential compared to Pt/C |
|---|---|---|---|---|---|---|
| 2. | Qu et al[S6] J. Am. Chem. Soc. 2012, 134, 15-18 | N-quantum dot supported graphene | 285 $\mu g/cm^2$, 10 mV/s | −0.16 V vs Ag/AgCl | 57.14 | 0.13 V |
| 3. | Niu et al[S7] J. Mater. Chem. 2012, 22, 6575-6580. | Nitrogen doped graphene | 20 $\mu g/cm^2$, 10 mV/s | −0.16 V vs Ag/AgCl | Not given (20% Pt/C) | 0.14 V |
| 4. | Chen et al[S8] Adv. Mater. 2013, 25, 3192-3196. | Nitrogen doped carbon nanotubes/graphene | 10 $\mu g$, 20 mV/s | −0.140 V vs $Hg/Hg_2Cl_2$ | Not given (20% Pt/C) | 0.07 V |
| 5. | Lin et al[S9] J. Mater. Chem. 2011, 21, 8038-8044. | Pyridinic nitrogen doped graphene | Not given, 10 mV/s | −0.3 V vs Ag/AgCl | Pt disk | 0.3 V |
| 6 | Dai et al[S10] ACS Nano 2011, 5, 6202-6209 | Functionalized graphene | 10 $\mu g$, 10 mV/s | −0.12 V vs SCE | Not given | 0.09 V |
| 7 | Hu et al[S11] Angew. Chem. Int. Ed. 2011, 50, 7132-7135 | Boron doped carbon nanotube | 102 $\mu g\ cm^2$, 10 mV/s | −0.35 V vs SCE | Not given (20% and 40% PtC) | 0.15 V |
| 8 | Dai et al[S12] J. Am. Chem. Soc. 2011, 133, 5182-5185. | Polyelectrolyte functionalized CNT | 10 $\mu g$, 10 mV/s | −0.12 V vs SCE | Not given | 0.09 V |
| 9 | Osaka et al[S13] Chem. Commun. 2011, 47, 4463-4465 | N-doped carbon nanocapsules | 480 $\mu g$, 10 mV/s | −0.1 V vs Ag/AgCl | Not given (10% Pt/C) | 0.1 V |
| 10 | Peng et al[S14] Angew. Chem. Int. Ed. 2011, 50, 3257-3261 | Phosphorous doped graphite layers | 159 $\mu g/cm^2$, 10 mV/s | −0.1 V vs Ag/AgCl | 159.1 | 0.1 V |
| 11 | Cho et al[S15] Angew. Chem. Int. Ed. 2013, 52, 1026-1030 | $Fe/Fe_3C$ functionalized melamine | 286 $\mu g/cm^2$, 10 mV | −0.02 V vs Hg/HgO | 9.5 and 28.6 | 0.07 V |
| 12 | Present work | Nitrogen doped carbon nanohorns | 255 $\mu g/cm^2$, 10 mV/s | 0.026 V vs Hg/HgO | 102 | 0.05 V |

TABLE 2

Onset potential ORR of some of the Fe based non-precious electrocatalyst recently reported.

| References | Material | Catalyst loading and scan rate | Onset potential | Pt loading ($\mu g\ cm^{-2}$) | Over potential compared to Pt/C |
|---|---|---|---|---|---|
| 1 Wu et al[51] J. Am. Chem. Soc., 2012, 134, 9082 | $Fe_3O_4$/N-GAs | 51 $\mu g/cm^2$, 10 mV/s | −0.19 V vs Ag/AgCl | 51 | 0.15 V (Pt onset is not given. Compared with their |

TABLE 2-continued

Onset potential ORR of some of the Fe based non-precious electrocatalyst recently reported.

| References | Material | Catalyst loading and scan rate | Onset potential | Pt loading (μg cm$^{-2}$) | Over potential compared to Pt/C |
|---|---|---|---|---|---|
| | | | | | own ACS nano Paper) |
| 2. Parvez et al[S2] ACS Nano 2012, 6, 9541 | NG/Fe | 50.91 μg/cm$^2$, 10 mV/s | −0.04 V vs Ag/AgCl | 50.91 | 0 V |
| 3. Yin et al[S3] Adv. Funct. Mater. 2014, 24, 2930 | Fe$_x$N/NGA | 51 μg/cm$^2$, 10 mV/s | 0 V vs Ag/AgCl | 51 | 0 V |
| 4. Xiang et al[S4] Angew. Chem. Int. Ed. 2014, 53, 2433 | C—COP—P—Fe | 200 μg/cm$^2$, 5 mV/s | 0.98 V vs RHE | 200 | 0 V |
| 5. Hu et al[S5] Angew. Chem. Int. Ed. 2014, 53, 36753 | Fe$_3$C/C-800 | 600 μg/cm$^2$, 10 mV/s | 1.05 V vs RHE | 50 | 0 V |
| 6 Dai et al[S6] ACS Nano 2011, 5, 6202 | Functionalized graphene | 10 μg, 10 mV/s | −0.12 V vs SCE | Not given | 0.09 V |
| 7 Liang et al[S7] DOI: 10.1002/adma. 201401848 | Fe—N-CNT-OPC | 80 μg, 5 mV/s | Not given | 80 μg | 0.018 V |
| 8 Dai et al[S8] ACS Appl. Mater. Interfaces 2013, 5, 12594-12601 | SN-OMC-4 | 306 μg/cm$^2$, 10 mV/s | −0.05 V vs Ag/AgCl | Not given | 0.01 V |
| 9 Cho et al[S9] Angew. Chem. Int. Ed. 2013, 52, 1026 | Fe/Fe$_3$C functionalized melamine | 286 μg/cm$^2$, 10 mV | −0.02 V vs Hg/HgO | 9.5 and 28.6 | 0.07 V |
| 10 Present work | FeNCNH-900 | 500 μg/cm$^2$, 5 mV/s | 0.026 V vs Hg/HgO | 60 | 0.03 V more positive than Pt/C |

ADVANTAGES OF THE INVENTION

1. A facile method to synthesize NCNHs in bulk level
2. Potential cost effective, metal-free cathode catalyst for polymer electrolyte membrane fuel cells.
3. High durability.
4. Possesses economic advantages over prevailing Pt catalyst.

We claim:

1. A process for preparation of nitrogen doped carbon nanohorns for use in oxygen reduction reactions (ORR) with enhanced conductivity and improved surface area consisting of:
   (a) pre-treating the carbon nanohorns;
   (b) annealing the carbon nanohorns of step (a) in the presence of a nitrogen source at 500-1200° C. for 1-3 hours;
   wherein the pre-treating of the carbon nanohorns results in functionalization of the carbon nanohorns, wherein the functionalization is carried out by mixing hydrogen peroxide with carbon nanohorns; and
   wherein the nitrogen doped carbon nanohorns are co-doped with a metal selected from the group consisting of Fe and Co.

2. The process according to claim 1, wherein the carbon nanohorns are single walled carbon nanohorns.

3. The process according to claim 1, wherein the nitrogen source is selected from the group consisting of urea and melamine.

4. The process according to claim 1, wherein a surface area of nitrogen doped carbon nanohorns ranges from 300 to 1500 m$^2$ g$^{-1}$.

5. The process according to claim 1, wherein a conductivity of the nitrogen doped carbon nanohorns is in the range of 5-9 S cm$^{-1}$.

6. The process according to claim 1, wherein nitrogen doped carbon nanohorns having a surface area in the range of 300 to 1500 $m^2\ g^{-1}$ and a conductivity in the range of 5-9 $S\ cm^{-1}$ are prepared by the method.

\* \* \* \* \*